(12) United States Patent
Korehisa et al.

(10) Patent No.: US 7,752,547 B2
(45) Date of Patent: Jul. 6, 2010

(54) INFORMATION PROCESSOR AND INFORMATION PROCESSING SYSTEM

(75) Inventors: Makoto Korehisa, Kanagawa (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 10/168,669

(22) PCT Filed: Jul. 13, 2001

(86) PCT No.: PCT/JP01/06094

§ 371 (c)(1), (2), (4) Date: Oct. 17, 2002

(87) PCT Pub. No.: WO02/35834

PCT Pub. Date: May 2, 2002

(65) Prior Publication Data

US 2003/0117429 A1 Jun. 26, 2003

(30) Foreign Application Priority Data

Oct. 26, 2000 (JP) ............................. 2000-327395
Jan. 22, 2001 (JP) ............................. 2001-013252

(51) Int. Cl.
*G06F 3/00* (2006.01)
(52) U.S. Cl. .................................... 715/721; 715/723
(58) Field of Classification Search ................ 715/723, 715/721, 727
See application file for complete search history.

(56) References Cited

U.S. PATENT DOCUMENTS

| 5,481,296 A * | 1/1996 | Cragun et al. ............... 725/136 |
| 5,870,754 A * | 2/1999 | Dimitrova et al. ......... 707/104.1 |
| 5,956,025 A * | 9/1999 | Goulden et al. ............. 715/716 |
| 6,115,035 A * | 9/2000 | Compton et al. ............ 715/717 |
| 6,141,702 A * | 10/2000 | Ludtke et al. .................. 710/5 |
| 6,211,856 B1 * | 4/2001 | Choi et al. ................... 345/666 |
| 6,360,234 B2 * | 3/2002 | Jain et al. ................ 715/500.1 |
| 6,366,296 B1 * | 4/2002 | Boreczky et al. ............ 715/719 |
| 6,509,892 B1 * | 1/2003 | Cooper et al. ............... 345/173 |
| 6,523,021 B1 * | 2/2003 | Monberg et al. ............... 707/2 |
| 6,580,437 B1 * | 6/2003 | Liou et al. ................... 715/719 |
| 6,684,218 B1 * | 1/2004 | Santos et al. ................ 707/102 |
| 6,728,763 B1 * | 4/2004 | Chen .......................... 709/219 |
| 6,760,042 B2 * | 7/2004 | Zetts ........................... 715/716 |
| 7,117,250 B1 * | 10/2006 | Wu ............................. 709/217 |
| 2002/0138641 A1 * | 9/2002 | Taylor et al. ................ 709/231 |
| 2003/0163211 A1 * | 8/2003 | Van Der Meulen ........... 700/94 |

FOREIGN PATENT DOCUMENTS

EP 0 939 549 9/1999

* cited by examiner

*Primary Examiner*—Ryan F Pitaro
(74) *Attorney, Agent, or Firm*—Frommer Lawrence & Haug LLP; William S. Frommer; Thomas F. Presson

(57) ABSTRACT

An information processing device comprises a device controller which controls a plurality of visual-audio reproducing units from the server via the device communication interfaces; content information unification recording section which controls content information corresponding to the contents of the contents storage from the server; and the GUI by which any content information from the server is selected and desired contents are reproduced without recognizing the unit.

27 Claims, 6 Drawing Sheets

INFORMATION PROCESSOR AND INFORMATION PROCESSING SYSTEM

TECHNICAL FIELD

The present invention relates to, for example, an information processing device and an information processing system, which perform information reproducing processing for a plurality of visual-audio reproducing units.

BACKGROUND ART

Hitherto, there has been a visual-audio reproducing system, wherein a plurality of visual-audio reproducing units are connected to a bus and the contents showing the details of the information source in a plurality of visual-audio reproducing units are reproduced.

However, in the above described visual-audio reproducing system, when a plurality of contents exist sporadically in a plurality of visual-audio reproducing units, the user is put to inconveniences of being required to grasp which visual-audio reproducing unit has the contents desired to reproduce and to supply an control signal to the visual-audio reproducing unit to order the numbers of the contents desired to reproduce by the so-called AV/C (AV/C Digital Interface Command Set) command using a controller.

DISCLOSURE OF THE INVENTION

Hence, the present invention is carried out in view of such inconveniences and an object of the present invention is to provide an information processing device and an information processing system capable of reproducing desired contents without recognizing the unit in a plurality of visual-audio reproducing units.

The information processing device of the present invention, in the information processing device which performs a control of information by connecting a plurality of information reproducing sections to an information processing section through an interface, comprises: reproducing control means for controlling a plurality of information reproducing sections from the information processing section; content information control means for controlling content information corresponding to the contents of an information source in a plurality of information reproducing sections from the information processing section; and content information selection means for selecting any content information in content information control means from the information processing section; wherein any information reproducing section having the contents corresponding to the content information selected by content information selection means is put into an operating state relative to reproducing by the reproducing control means from the information processing section.

Further, the information processing system of the present invention, in the information processing system which performs a control of information by connecting a plurality of information reproducing devices to a server device via an interface, comprises: reproducing control means for controlling a plurality of information reproducing devices from the server device; content information control means for controlling content information corresponding to the contents of the information source in a plurality of information reproducing devices from the server device; and content information selection means for selecting any content information in content information control means from the server device; wherein any information reproducing device having the contents corresponding to content information selected by content information selection means is put into an operating state relative to reproducing by the reproducing control means from the server device.

Therefore, according to the present invention, the following operations are performed.

First, an operation for acquiring content information will be shown.

Contents are set in the visual-audio reproducing unit. When the contents are mounted on the visual-audio reproducing unit, a content information controller reads a content information corresponding to the contents from a content information recording section.

The content information is transmitted to the server from the visual-audio reproducing unit. The content information read by content information controller is transmitted by a device communication controller to a server via a device communication interface.

The server receives this information. In the server, the device communication controller acquires content information via the device communication interface.

The content information controller records this information and a unit ID of the visual-audio reproducing unit which transmitted this information in a content information unification recording section. The content information controller records the acquired content information in a content information unification recording section. The recorded information in content information unification recording section includes content information and the unit ID to judge in which visual-audio reproducing unit the information is recorded.

A judgment is made as to whether other visual-audio reproducing unit is connected or not. When other visual-audio reproducing unit is connected, the above described processing and judgment are repeated. When other visual-audio reproducing unit is not connected, the information of all the contents is displayed on a GUI, and the process moves to an operating action of the contents described below.

Next, the operating action of the contents will be shown.

The user selects content information desired to watch and listen from the GUI and instructs its operation procedure. By using the GUI, the user peruses content information recorded in content information unification recording section. The user selects content information desired to watch and listen from content information by perusing and instructs how to operate the contents corresponding to the selected content information.

From content information unification recording section a main controller judges in which visual-audio reproducing unit the contents exist. First, the main controller supplies the selected content information to content information controller and judges in which visual-audio reproducing unit the information exists.

The main controller commands the device controller to execute the operation procedure which the user instructed for the target device. The main controller supplies the operation procedure of the contents which the user instructed and the unit ID of the visual-audio reproducing unit to the device controller.

A device control signal is transmitted to the target visual-audio reproducing unit. The device communication controller reads the device control signal from the device controller and transmits a device control signal showing the contents desired to watch and listen and the operation procedure thereof to the target visual-audio reproducing unit via the device communication interface.

The visual-audio reproducing unit, which received the device control signal, operates the contents which the user desires to watch and listen by a content controller. In the target visual-audio reproducing unit, the device communication controller receives the device control signal via the device communication interface. The content controller performs operations such as reproducing the contents based on the device control signal.

BEST MODE FOR CARRYING OUT THE INVENTION

The present embodiments adapted to an information processing device of the present invention will be described below.

The information processing device of the present embodiment can reproduce desired contents without recognizing the unit among a plurality of visual-audio reproducing units.

Figure 1:
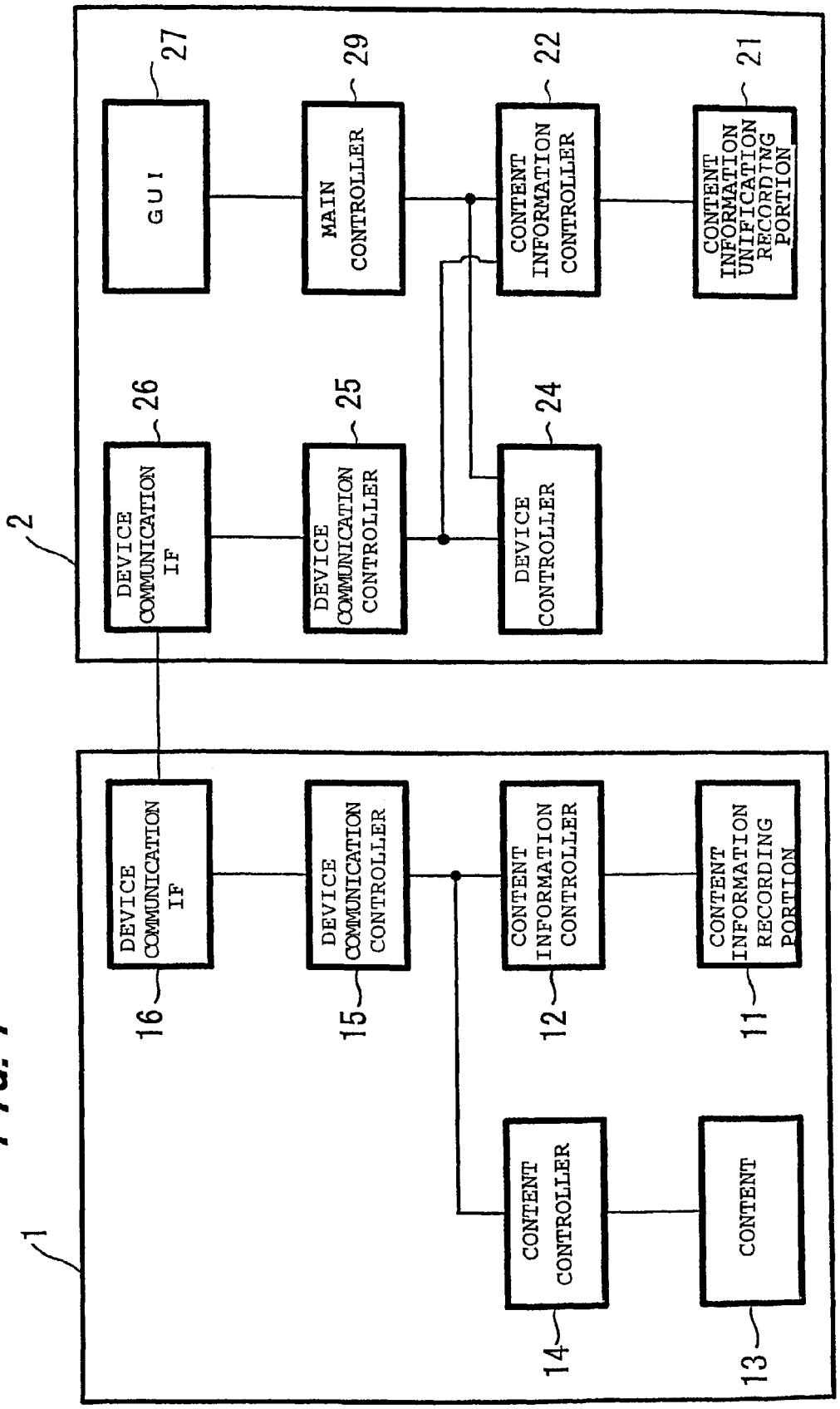
FIG. 1 is a block diagram showing a constitution of a content reproducing system adapted to an information processing device of the present embodiment.

FIG. 1 is a diagram showing a content reproducing system adapted to the information processing device of the present embodiment.

First, a constitution of the content reproducing system will be described.

The content reproducing system is constituted by comprising an visual-audio reproducing unit 1 which is represented by MD (Mini Disk) and the like having information such as titles and the like of the contents and a server 2 which can control the information of the contents of such a plurality of visual-audio reproducing units.

The visual-audio reproducing unit 1 is constituted by comprising: a content information recording section 11 which recorded content information; a content information controller 12 capable of managing and controlling content information; a contents storage 13; a content controller 14 capable of controlling the contents storage 13 to reproduce contents; a device communication controller 15 to communicate content information with the outside and a communication interface 16. Further, a state such as which contents a plurality of visual-audio reproducing units 1 are reproducing or stopping may be transmitted to the server 2, and displayed on a GUI 27 in the server 2.

The server 2 is constituted by comprising: a content information unification recording section 21, which is a database collecting content information of a plurality of visual-audio reproducing units 1; a content information controller 22 which manages and controls the unified content information; a device controller 24 which records and reproduces contents of the content storage 13 in the connected visual-audio reproducing unit 1 or manages the contents of the content storage 13 which is presently being recorded and reproduced; a device communication controller 25 which controls communications with the visual-audio reproducing unit 1; a communication interface 26; a GUI 27 which displays content information so as to enable the user to select; and a main controller 29 which controls the GUI 27, the device controller 24 and content information controller 22. Further, when a command to operate certain contents from a user was inputted from the GUI 27 in a server 2, the server 2 may change a handling of the user's command according to a state of the visual-audio reproducing unit 1 which has the contents. Specifically, in the case where the user sends a command to reproduce certain contents from the GUI 27 in the server 2, when the visual-audio reproducing unit 1 having the contents has already been reproducing other contents, the command from the user is disregarded so that the content control signal is not transmitted to the visual-audio reproducing unit 1 and the server 2 may notify the user of a message on the GUI 27 to the effect that "no reproducing is possible since other contents are being reproduced at present".

Next, the operation of the content reproducing system constituted in such a manner will be described.

Figure 2:
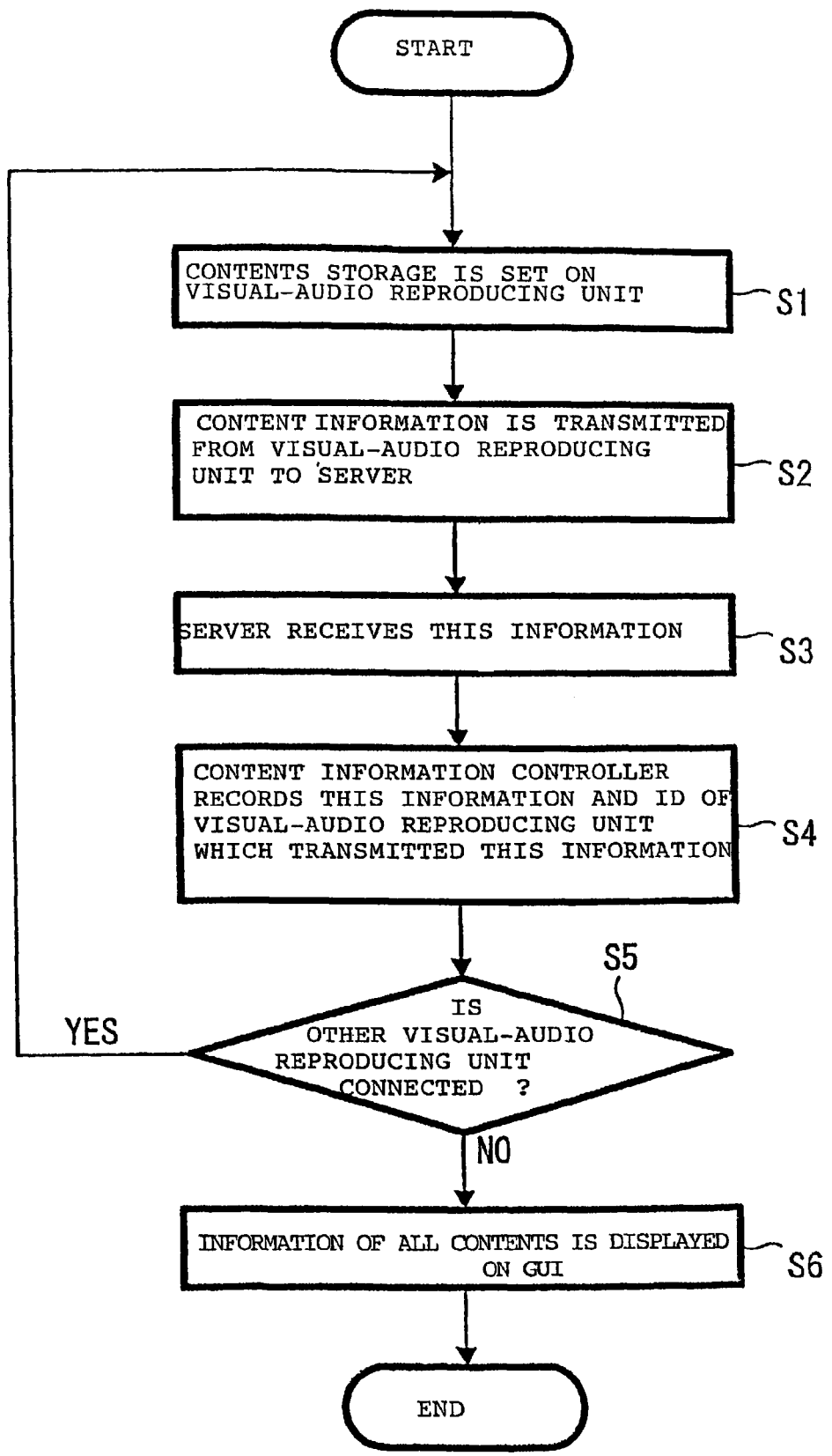
FIG. 2 is a flowchart showing an acquiring operation of a content information.

FIG. 2 is a flowchart showing an operation of acquiring content information.

First, in step S1, the contents storage is set in the visual-audio reproducing unit. Specifically, when the contents storage 13 was mounted in the visual-audio reproducing unit 1, content information controller 12 reads content information corresponding to the contents from content information recording section 11. On this occasion, when a plurality of contents exists, all content information is read.

In step S2, content information is transmitted to the server from the visual-audio reproducing unit. Specifically, content information read by content information controller 12 is transmitted to the server 2 by the device communication controller 15 via the device communication interface 16. On this occasion, when a plurality of contents exist, identifiers and content information for all the contents are listed and transmitted.

In step S3, the server receives this information. Specifically, in the server 2, the device communication controller 25 acquires content information via the device communication interface 26.

In step S4, content information controller records this information and the unit ID of the visual-audio reproducing unit which transmitted this information, in a content information unification recording section. Specifically, content information controller 22 records the acquired content information in content information unification recording section 21. The recorded information in content information unification recording section 21 includes content information and the unit ID to judge in which visual-audio reproducing unit 1 content information is recorded.

In step S5, a judgment is made as to whether other visual-audio reproducing unit is connected or not. In step S5, when other visual-audio reproducing unit is connected, the process returns to step S1 and repeats the processes and judgments from step S1 to step S5. In step S5, when no other visual-audio reproducing unit is connected, the process advances to step S6 and displays the information of all the contents on a GUI, and moves to the operation action of the contents described below.

Figure 3:
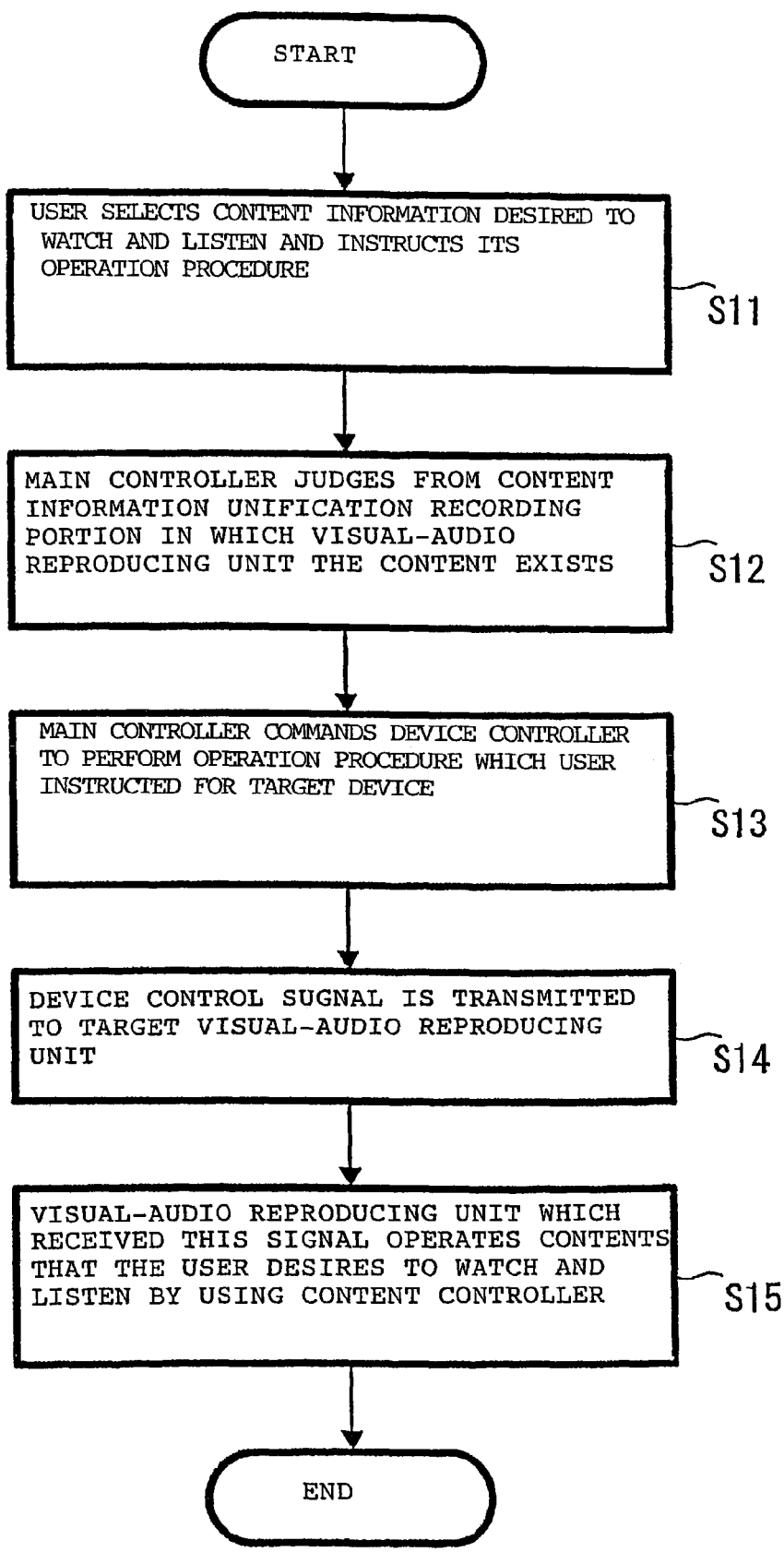
FIG. 3 is a flowchart showing an operation action of a content.

FIG. 3 is a flowchart showing the operation action of the contents.

In step S11, the user selects content information desired to watch and listen from the GUI and instructs its operation procedure. Specifically, by using the GUI 27, the user peruses content information recorded in content information unification recording section 21. The user selects content information desired to watch and listen from the perused content information and instructs how to operate the contents corresponding to the selected content information.

In step S12, a main controller judges in which visual-audio reproducing unit the contents exist from content information unification recording section. Specifically, first, the main controller 29 supplies the selected content information to content information controller 22 and judges in which visual-audio reproducing unit the information exists.

In step S13, the main controller commands the device controller to perform the operation procedure instructed by the user for the target device. Specifically, the main controller 29 supplies the operation procedure of the contents instructed by the user and the unit ID of the visual-audio reproducing unit to the device controller 24.

In step S14, the device control signal is transmitted to the target visual-audio reproducing unit. Specifically, the device communication controller 25 reads the device control signal from the device controller 24, and transmits an identification data of the contents desired to watch and listen and a device control signal showing the operation procedure thereof to the target visual-audio reproducing unit 1 via the device communication interface 26.

In step S15, the visual-audio reproducing unit which received the device control signal operates the contents which the user desires to watch and listen by using the content controller. Specifically, in the target visual-audio reproducing unit, the device communication controller 15 receives the device control signal via the device communication interface 16. The content controller 14 performs operations such as reproducing the contents of the contents storage 13 based on the device control signal. Note that the operation of reproducing includes an action relating to reproducing, that is, reproduction, stop, deletion and the like.

With regard to the selection of content information, the above described information processing device has a GUI which displays content information to select.

Further, in the above described information processing device, by the selection of content information using the GUI, an event ID of the MPEG stream of the contents may be selected as content information. The event ID is attached to digital broadcasting programs one by one. In this case, the title comprising content information may be formed from the event ID.

Further, in the above described information processing device, by the selection of content information using the GUI, the title of the contents may be selected as content information. Further, in the above described information processing device, by the selection of content information using the GUI, the recording dates of the contents may be selected as content information.

Further, in the above described information processing device, a plurality of visual-audio reproducing units may supply by themselves content information to an content information unification managing section 21 of the server 2.

Further, in the above described information processing device, content information unification managing section 21 may make an inquiry about content information to a plurality of visual-audio reproducing units.

Further, in the above described information processing device, an inquiry about content information may be made to a plurality of visual-audio reproducing units from the server 2 having the GUI, which performs the selection of content information Further, in the above described information processing device, content information may be supplied to the server 2 having the GUI which performs the selection of content information from a plurality of visual-audio reproducing units.

Further, in the above described information processing device, the timing in which content information is updated may be a timing in which the contents of the contents storage mounted on a plurality of visual-audio reproducing units were updated. In this case, for example, content information may be automatically transmitted to the server 2 at the time when the contents of the contents storage are mounted on the visual-audio reproducing unit.

Further, in the above described information processing device, the timing in which content information is updated may be periodic at fixed time intervals. In this case, for example, the server 2 periodically performs the transmission of a polling signal, so that content information may be inquired about from the visual-audio reproducing unit.

Further, in a plurality of visual-audio reproducing units, the same contents are differentiated, so that the contents may be sorted from a disc-reproducing unit of relatively good sound quality to a tape-reproducing unit of relatively bad sound quality.

Note that, on the occasion when content information is selected, at least a plurality of visual-audio reproducing units may be put into a standby state capable of reproducing immediately when the power source is turned on.

Further, a plurality of visual-audio reproducing units may be CD (Compact Disc) auto-changer devices or video reproducing units of VHS (Video Home System) or DVHS (Digital VHS).

Further, as content information, for example, CD texts may be used in the case of CD reproducing units and TOC (Table Of Contents) data may be used in the case of MD reproducing units. Further, in this case, other data may be added to the CD texts and TOC data.

Further, as content information, for example, in the case of the tape-reproducing unit, the added data recorded on the tape label attached to a tape cassette may be used.

Further, as content information, for example, channel data or characters data of the electronic program guide (EPG) used for the digital broadcasting may be used. Further, the data of the electronic program guide may be processed so as to form titles.

Further, in the case where the titles are used as content information, for example, the information of "the title+the unit ID+what number" may be recorded in content information unification recording section 21 in the server 2.

Further, at the time when content information is selected, in order to certify a user's profile the information of "how old+male or female" may be inputted to the server 2.

Further, the server 2 may provide an appropriate content information separately for certain age or gender according to the information of "how old+male or female" of the certified result of the user's profile by applying a predetermined filter.

Further, content information unification managing section 21 in the server 2 stores a content information table which records content information, so that items to be applied with the predetermined filter may be distinguished in advance.

Figure 4:
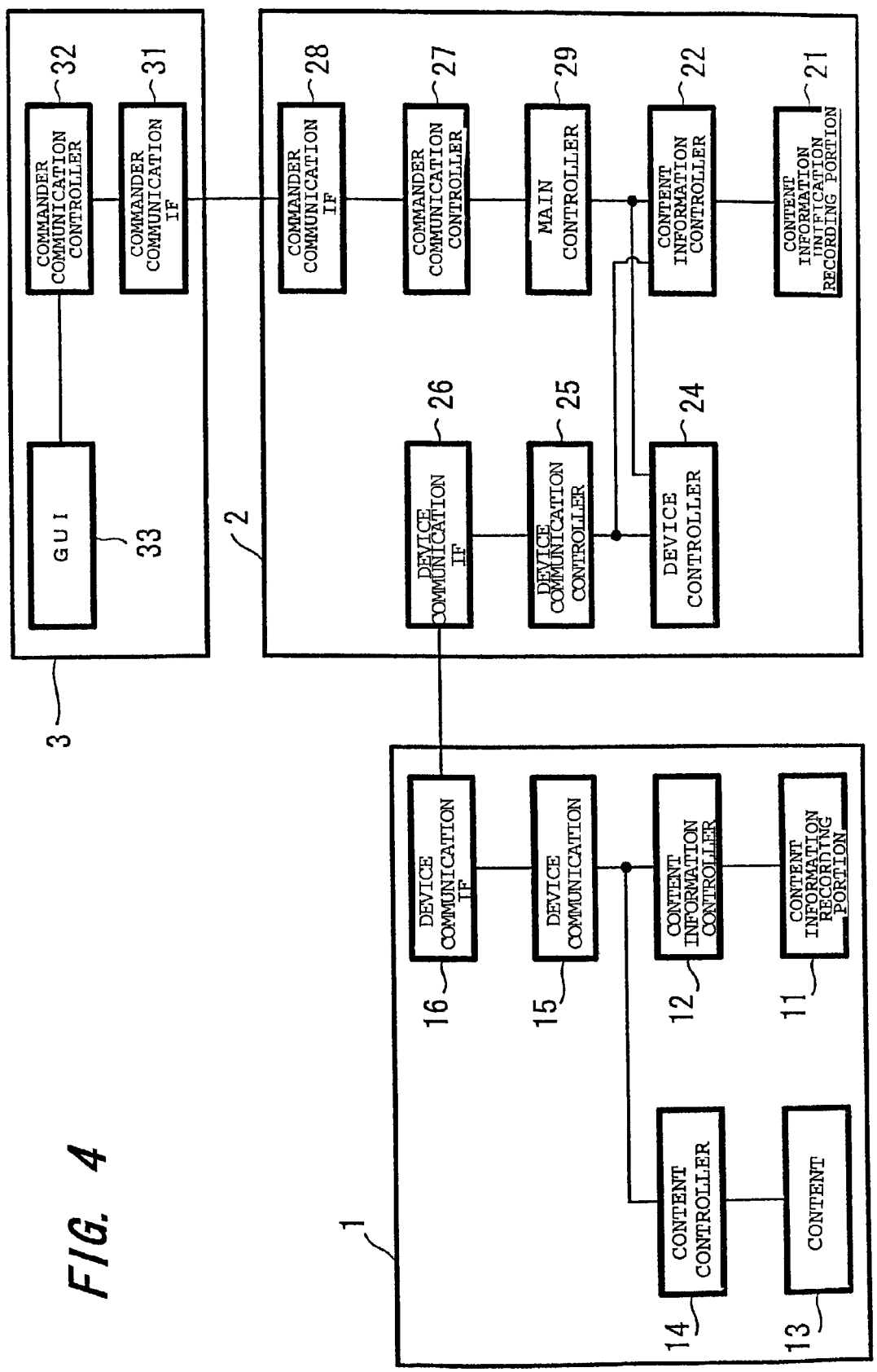
FIG. 4 is a block diagram showing the constitution of the content reproducing system adapted to other information processing device.

FIG. 4 is a diagram showing a content reproducing system which is adapted to other information processing device of the present embodiment.

First, a constitution of the content reproducing system will be described.

The content reproducing system is constituted by comprising: the visual-audio reproducing unit 1 which is represented by MD and the like having the information such as the titles and the like of the same contents as shown in FIG. 1; the server 2 capable of collectively managing the information of contents contained in a plurality of visual-audio reproducing units 1; and a commander 3 containing the GUI, by which the user operates the contents via the server 2. Further, a state such as which contents a plurality of visual-audio reproducing units 1 are reproducing or stopping is transmitted to the server 2, and may be displayed on a GUI 33 in the commander 3 from the server 2.

The server 2 is constituted by comprising: content information unification recording section 21 which is a database collecting content information of a plurality of visual-audio reproducing unit 1; content information controller 22 to manage and control the unified content information; the device controller 24 to record and reproduce the contents of the contents storage 13 of the connected visual-audio reproducing unit 1 or manage the contents of the contents storage 13 which are presently being recorded and reproduced; the device communication controller 25 to control communications with the visual-audio reproducing unit 1; the communication interface 26; a commander communication controller 27 to communicate with the commander 3; the commander communication interface 28; and the main controller 29 to control the device controller 24, content information controller 22 and the commander communication controller 27. Further, when a command from the user to operate certain contents is transmitted to the server 2 from a GUI 33 in the commander 3, the server 2 may change a handling of the command from the user according to the state of the visual-audio reproducing unit 1 which has the contents. Specifically, in the case where the user sends a command from the GUI 33 in the commander 3 to reproduce certain contents, when the visual-audio reproducing unit 1 having the contents has already been reproducing other contents, the command from the user is disregarded so that the content control signal is not transmitted to the visual-audio reproducing unit 1 and a message from the server 2 to the effect that "no reproducing is possible since other contents are being reproduced at present" is displayed on the GUI 33 in the commander 3, and the user may be notified accordingly.

The commander 3 is constituted by comprising: a communication interface 31 which performs communications with the server 2; a commander communication controller 32 as the controller for the communication interface 31; and the GUI 33 capable of displaying content information for the user to select.

Next, the operation of other content reproducing system constituted in such a manner will be described.

The operation of acquiring content information until content information in the visual-audio reproducing unit is recorded in content information unification recording section 21 in the server 2 is the same as the above described operation in flowchart shown in FIG. 2 and therefore the description thereof will be omitted.

The operation action of the contents will be described below.

The main controller 29 reads content information recorded in content information unification recording section 21 by the content information controller 22. The main controller 29 transmits the read content information to the commander 3 by the commander communication controller 27 via the commander communication interface 28.

In the commander 3, the commander communication controller 32 receives content information via a commander communication interface 31.

By using the GUI 33, the user peruses the received content information. The user selects content information desired to watch and listen from the perused content information and instructs how to operate the contents corresponding to the selected content information.

In the commander 3, the commander communication controller 32 transmits content information and an operation instructing information selected via the commander communication interface 31 to the server 2.

In the server 2, the main controller 29 receives the selected content information and operation instructing information by the commander communication controller 27 via the commander communication interface 28. The main controller 29 supplies the selected content information to content information controller 22. The content information controller 22 judges in which visual-audio reproducing unit the selected content information exists.

Next, the main controller 29 supplies the operation procedure of the contents instructed by the user and the unit ID of the visual-audio reproducing unit to the device controller 24.

The device communication controller 25 reads the device control signal from the device controller 24 and transmits the identifier data of the contents desired to watch and listen and the device control signal showing the operation procedure thereof to the target visual-audio reproducing unit 1 via the device communication interface 26.

In the target visual-audio reproducing unit 1, the device communication controller 15 receives the device control signal via the device communication interface 16. The content controller 14 performs operations such as reproducing the contents of the content storage 13 based on the device control signal. Note that the operation of reproducing includes the action relative to reproducing, that is, reproduction, stop, deletion and the like.

Further, in the above described information processing device, as the commander 3, for example, a portable telephone and a portable electric terminal may be used. In this case, as the commander communication interface, for example, an infrared system by Bluetooth standard may be used.

Figure 5:
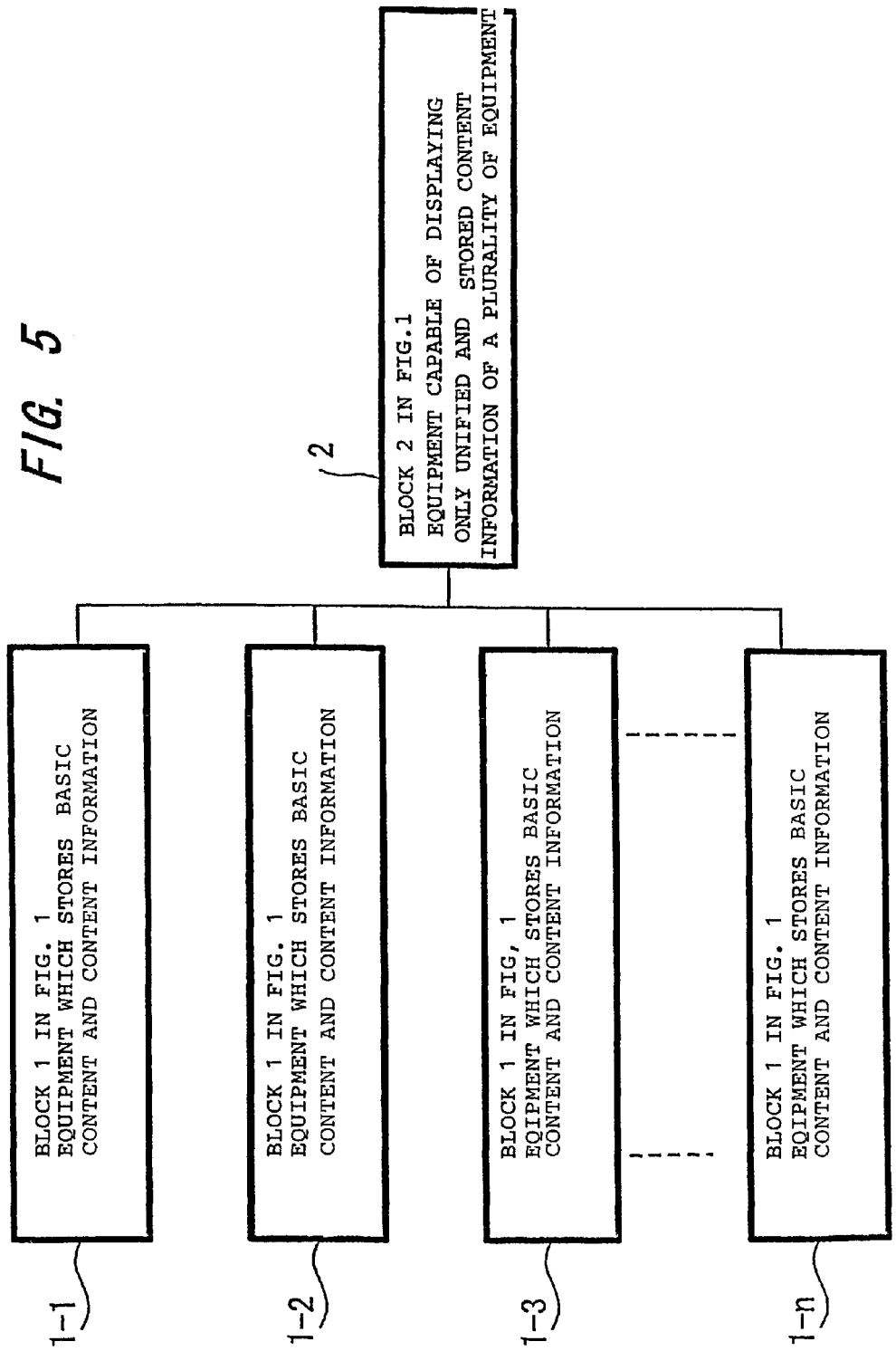
FIG. 5 is a diagram showing an enlarged example of FIG. 1.

FIG. 5 is a diagram showing an enlarged example of the content reproducing system adapted to the information processing device of the present embodiment shown in FIG. 1.

Difference between the enlarged example shown in FIG. 5 and that shown in FIG. 1 is that a plurality of visual-audio reproducing units 1-1, 1-2, 1-3, . . . 1-$n$ are connected to the server 2 in FIG. 5. Other constitution is the same as that in FIG. 1 and therefore the description thereof will be omitted.

Next, the operation of the content reproducing system of the enlarged example constituted in such a manner will be described.

When the contents of the contents storage 13 are mounted in any of the visual-audio reproducing units 1-1, 1-2, 1-3, . . . 1-$n$, content information controller 12 reads content information corresponding to the respective contents from content information recording section 11.

The content information read by the content information controller 12 is transmitted to the server 2 by the device communication controller 15 via the device communication interface 16.

In the server 2, the device communication controller 25 acquires content information via the device communication interface 26.

The content information controller 22 records the acquired content information in content information unification recording section 21. The recorded information in content information unification recording section 21 includes content information and the unit ID to judge in which visual-audio reproducing units content information is recorded.

When other visual-audio reproducing units 1-1, 1-2, 1-3, . . . 1-$n$ are connected, the above described processes and judgment are repeated. When other visual-audio reproducing units 1-1, 1-2, 1-3, . . . 1-n are not connected, the information of all the contents are displayed on the GUI in the server 2, and the process moves to the operation action of the contents described below.

By using the GUI 27 in the server 2, the user peruses content information recorded in content information unification recording section 21. The user selects content information desired to watch and listen from the perused content information and instruct how to operate the contents corresponding to the selected content information.

First, the main controller 29 supplies the selected content information to content information controller 22, and judges in which visual-audio reproducing units among 1-1, 1-2, 1-3, . . . 1-n the information exists.

The main controller 29 supplies the operation procedure which the user instructed and the unit ID of the visual-audio reproducing units 1-1, 1-2, 1-3, . . . 1-n to the device controller 24.

The device communication controller 25 reads a device control signal from the device controller 24 and transmits the device control signal showing the contents desired to watch and listen and the operation procedure thereof to the target visual-audio reproducing units 1-1, 1-2, 1-3, . . . 1-n via the device communication interface 26.

In the target visual-audio reproducing units 1-1, 1-2, 1-3, . . . 1-n, the device communication controller 15 receives the device control signal via the device communication interface 16. The content controller 14 performs operations such as reproducing the contents of the contents storage 13 based on the device control signal. Note that the operation of reproducing includes an operation relating to reproducing, that is, reproduction, stop, deletion and the like.

Figure 6:
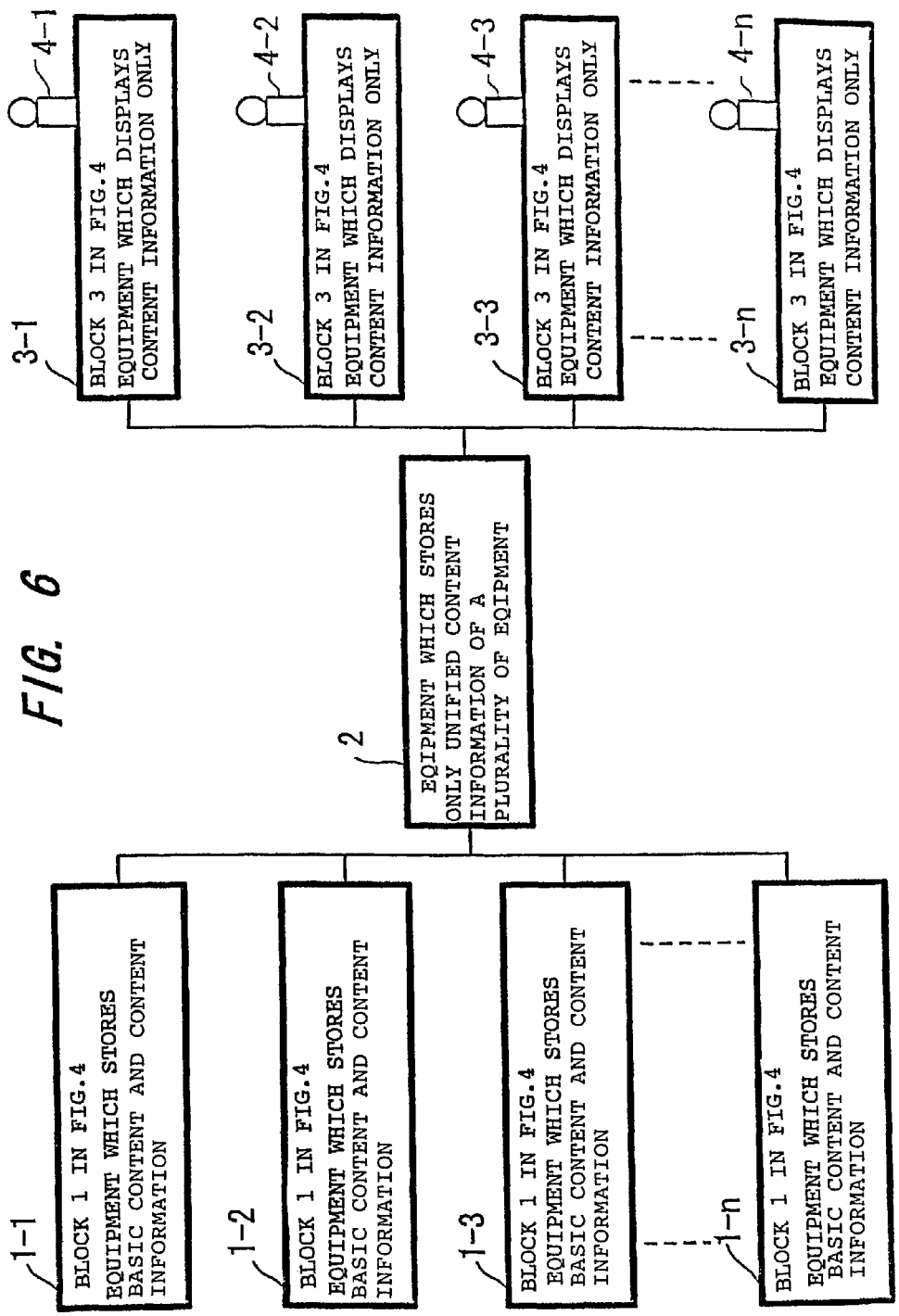
FIG. 6 is a diagram showing the enlarged example of FIG. 4.

FIG. 6 is a diagram showing the enlarged example of the content reproducing system adapted to other information processing device of the present embodiment shown in FIG. 4.

Difference between the enlarged example shown in FIG. 6 and that shown in FIG. 4 is that a plurality of visual-audio reproducing units 1-1, 1-2, 1-3, . . . 1-n and a plurality of commanders 3-1, 3-2, 3-3, . . . 3-n are connected to the server 2, and each of them is operated by different users 4-1, 4-2, 4-3, . . . 4-n in FIG. 6. Other constitution is the same as that in FIG. 4 and therefore the description thereof will be omitted.

Next, the operation of the content reproducing system of other enlarged example constituted in such a manner will be described.

The content information acquiring operation until content information in the visual-audio reproducing unit is recorded in content information unification recording section 21 in the server 2 is the same as the above described operation shown in FIG. 5 and therefore the description thereof will be omitted.

The operation action of the contents will be described below.

In the server 2, the main controller 29 reads content information recorded in content information unification recording section 21 by content information controller 22. The main controller 29 transmits the read content information to the commanders 3-1, 3-2, 3-3, . . . 3-n by the commander communication controller 27 via the commander communication interface 28.

In the commanders 3-1, 3-2, 3-3, . . . 3-n, the commander communication controller 32 receives content information via the commander communication interface 31.

The users 4-1, 4-2, 4-3, . . . 4-n peruse the received content information by using the GUI 33. The users 4-1, 4-2, 4-3, . . . 4-n select content information desired to watch and listen from the perused content information and instruct how to operate the contents corresponding to the selected content information.

In the commanders 3-1, 3-2, 3-3, . . . 3-n, the commander communication controller 32 transmits the selected content information and the operation instructing information to the server 2 via the commander communication interface 31.

In the server 2, the main controller 29 receives the selected content information and the operation instructing information by the commander communication controller 27 via the commander communication interface 28. The main controller 29 supplies the selected content information to content information controller 22. The content information controller 22 judges in which visual-audio reproducing units among 1-1, 1-2, 1-3, . . . 1-n the selected content information exists.

Next, the main controller 29 supplies the operation procedure of the contents which the users instructed and the unit IDs of the visual-audio reproducing units 1-1, 1-2, 1-3, . . . 1-n to the device controller 24.

The device communication controller 25 reads the device control signal from the device controller 24 and transmits the device control signal showing the contents desired to watch and listen and the operation procedure thereof to the target visual-audio reproducing units 1-1, 1-2, 1-3, . . . 1-n via the device communication interface 26.

In the target visual-audio reproducing units 1-1, 1-2, 1-3, . . . 1-n, the device communication controller 15 receives the device control signal via the device communication interface 16. The content controller 14 performs operations such as reproducing the contents of the contents storage 13 based on the device control signal. Note that the operation of reproducing includes an operation relating to reproducing, that is, reproduction, stop, deletion and the like.

In the above described information processing device, an example using a plurality of visual-audio reproducing units 1 and the server 2 was shown, however, it is not limited to this example, and may be adapted to the case where content information of photographic image data by a plurality of digital cameras is supplied to a personal computer and the photographic image data of the desired contents is reproduced from the personal computer.

Further, in the above described information processing device, as the device communication interface between a plurality of visual-audio reproducing units 1 and the server 2, for example, the communication system of IEEE1349 standard may be used or Ethernet may be used.

Further, in the above described information processing device, when a network is formed between a plurality of visual-audio reproducing units 1 and the server 2, content information may be acquired using a network table which stores the information inside the network.

Note that the above described plurality of visual-audio reproducing units 1, the server 2 and a plurality of commanders 3 may be integrally formed, similarly to a CD auto changer. In this case, each visual-audio reproducing unit 1 and the server 2, and the server 2 and a plurality of commanders 3 are separated and, for example, may be used several meters apart.

The information processing device according to the invention, in the information processing device to connect a plurality of information reproducing sections to the information processing section via an interface and to perform a control of the information, comprises: reproducing control means for controlling a plurality of information reproducing sections from the information processing section; content information managing means for managing content information corresponding to the contents of the information source in a plurality of information reproducing sections from the information processing section; and content information selection means for selecting any content information in content information managing means from the information processing section, wherein any information reproducing section having the contents corresponding to content information selected by content information selection means is put to an active state relative to reproducing by reproducing control means controlling from the information processing section so that the user is not required to recognize in which information reproducing section the contents desired to watch and listen exist and, therefore, only simply by selecting content information corresponding to the contents desired to be reproduced from the information processing section, the contents can be watched and listened without recognizing the information reproducing section, thereby producing the effect of being able to enhance operability.

Further, in the information processing device according to the invention, in the above description, content information selection means has the GUI capable of displaying content information for selection, thereby producing the effect of the user being able to select content information corresponding to the contents desired to watch and listen from a screen without difficulty.

Further, the information processing device according to the invention, in the above description, selects the event ID of the MPEG stream of the contents as content information by content information selection means, thereby producing the effect of being able to form content information without difficulty by using the event ID given to every program of the digital broadcasting.

Further, the information processing device according to the invention, in the above description, selects the title of the contents as content information by content information selection means, thereby producing the effect of being able to form content information without difficulty by using, for example, the titles of the music such as the CD texts and TOC data of MD.

Further, the information processing device according to the invention, in the above description, selects the recorded date and time of the contents as content information by content information selection means, thereby producing the effect of being able to form content information without difficulty by using the recorded date and time of the contents.

Further, the information processing device according to the invention, in the above description, provides active state recognition means for recognizing the active state of a plurality of information reproducing sections, thereby producing the effect of being able to recognize the active state such as which contents a plurality of information reproducing sections are reproducing or stopping.

Further, the information processing device according to the invention, in the above description, provides operation command change means for changing a handling of the content operation commands from the user according to the operation state of a plurality of information reproducing sections, thereby producing the effect of being able to change a handling of the content operation commands from the user according to the active state such as which contents a plurality of information reproducing sections are reproducing or stopping.

Further, in the information processing device according to the invention, in the above description, since a plurality of information reproducing sections themselves supply content information to content information managing means, content information is automatically acquired from a plurality of information reproducing sections, thereby producing the effect of being able to record content information in content information managing means without difficulty.

Further, in the information processing device according to the invention, in the above description, the information managing means makes an inquiry about content information to a plurality of information reproducing sections, thereby producing the effect of being able to acquire content information by responses provided from a plurality of information reproducing sections to the inquiries.

Further, the information processing device according to the invention, in the above description, makes an inquiry about content information from content information selection means having the GUI to a plurality of information reproducing sections, thereby producing the effect of being able to make the GUI display content information acquired by responses to inquiries from a plurality of information reproducing sections.

Further, the information processing device according to the invention, in the above description, supplies content information to content information selection means having the GUI from a plurality of information reproducing sections, thereby producing the effect of being able to automatically display by the GUI content information acquired from a plurality of information reproducing sections.

Further, in the information processing device according to the invention, in the above description, the timing in which content information is updated is a timing in which the contents mounted on a plurality of information reproducing sections are updated, thereby producing the effect of being able to update content information by matching to the timing in which new contents are mounted on a plurality of information reproducing sections or the contents thereof are removed.

Further, the information processing device according to the invention, in the above description, the timing in which content information is updated is periodic at fixed time intervals, thereby producing the effect of being able to update content information by matching to the timing which is periodic at fixed time intervals Further, an information processing system according to the invention, in the information processing system to perform a control of information by connecting a plurality of information reproducing devices to a server device via an interface, comprises: reproducing control means for controlling a plurality of information reproducing devices from the server device; content information managing means for managing content information corresponding to contents of an information source in a plurality of information reproducing devices from the server device; and content information selection means for selecting any content information in content information managing means from the server device, wherein any information reproducing device having the contents corresponding to content information selected by content information selection means is put to an active state relative to reproducing by reproducing control means controlling from the server device, so that the user is not required to recognize in which information reproducing section the contents desired to watch and listen exist and, therefore, only by simply selecting content information corresponding to the contents desired to be reproduced from the server, the contents can be watched and listened without recognizing the information reproducing section, thereby producing the effect of being able to enhance operability.

Further, in the information processing system according to the invention, in the above description, content information selection means has the GUI capable of displaying content information for selection, thereby producing the effect of being able to select content information corresponding to the contents that the user desires to watch and listen on the screen without difficulty.

Further, the information processing system according to the invention, in the above description, selects the event ID of the MPEG stream of the contents as content information, thereby producing the effect of being able to form content information without difficulty by using the event ID given to every program of the digital broadcasting.

Further, the information processing system according to the invention, in the above description, selects the title of the contents as content information by content information selection means, thereby producing the effect of being able to form content information without difficulty by using the titles of the music, for example, such as CD text data, TOC data of MD and the like.

Further, the information processing system according to the invention, in the above description, selects the recorded date and time of the contents as content information, thereby producing the effect of being able to form content information without difficulty by using the recorded date and time of the contents.

Further, the information processing system according to the invention, in the above description, provides active state recognition means for recognizing the active state of a plurality of information reproducing devices, thereby producing the effect of being able to recognize the active state such as which contents a plurality of information reproducing sections are reproducing or stopping.

Further, the information processing system according to the invention, in the above description, provides operation command change means for changing a handling of content operation commands from the user according to the active state of a plurality of information reproducing devices, thereby producing the effect of being able to change a handling of the content operation commands from the user according to the active state such as which contents a plurality of reproducing sections are reproducing or stopping.

Further, in the information processing system according to the invention, in the above description, since a plurality of information reproducing sections themselves supply content information to content information managing means, content information is automatically acquired from a plurality of information reproducing sections, thereby producing the effect of being able to record content information without difficulty in content information managing means.

Further, in the information processing system according to the invention, in the above description, the information managing means makes an inquiry about content information to a plurality of information reproducing sections, thereby producing the effect of being able to acquire content information by responses to inquiries from a plurality of information reproducing sections.

Further, in the information processing system according to the invention, in the above description, an inquiry about content information is made to a plurality of information reproducing sections from content information selection means having the GUI, thereby producing the effect of being able to display by the GUI content information acquired by responses to inquiries from a plurality of information reproducing sections.

Further, the information processing system according to the invention, in the above description, supplies content information to content information selection means having the GUI from a plurality of information reproducing sections, thereby producing the effect of being able to automatically display by the GUI content information acquired from a plurality of information reproducing sections.

Further, in the information processing system according to the invention, in the above description, the timing in which content information is updated is a timing in which the contents mounted on a plurality of information reproducing sections were updated, thereby producing the effect of being able to update content information by matching to the timing in which new contents were mounted on a plurality of information reproducing sections or the contents thereof were removed.

Further, in the information processing system according to the invention, in the above description, the timing in which content information is updated is periodic at fixed time intervals, thereby producing the effect of being able to update content information by matching to the timing which is periodic at fixed time intervals.

INDUSTRIAL APPLICABILITY OF THE INVENTION

The present invention is, for example, adapted to the information processing device and the information processing system to perform information reproducing processing for a plurality of visual-audio reproducing units, and a content reproducing system is adapted to the visual-audio reproducing unit 1 represented by MD (Mini Disk) and the like having the information such as the title of the contents and the server 2 capable of managing the contents information of a plurality of visual-audio reproducing unit 1.

The invention claimed is:

1. An information processing apparatus in which a plurality of information reproducing units are connected to an information processing unit via an interface to perform control of information, the information processing apparatus comprising:

reproducing control means for controlling said plurality of information reproducing units;

content information managing means for managing content information corresponding to contents of an information source in said plurality of information reproducing units;

content information selection means for selecting any content information in said content information managing means from said information processing unit; and operation command change means for changing a handling of a content operation command from a user as a function of whether selected information reproducing units are active and whether selected reproducing units are currently reproducing different content, wherein said information processing unit records selected content information and a unit ID of one of said plurality of information reproducing units which has said content information, wherein said information processing apparatus displays said content information when no other information reproducing units are connected to said information processing unit, the displayed content information providing for selection of the content information, and wherein the information reproducing unit having the content corresponding to the content information selected is put to an active state for reproducing the content.

2. The information processing apparatus according to claim 1, wherein said content information selection means has a GUI (Graphical User Interface) capable of displaying content information for selection.

3. The information processing apparatus according to claim 1, wherein
an event ID (identification) of an MPEG (Moving Picture Experts Group) stream of the contents is selected as content information by said content information selection means.

4. The information processing apparatus according to claim 1, wherein
a title of the contents is selected as content information by said content information selection means.

5. The information processing apparatus according to claim 1, wherein
the recorded date and time of the contents are selected as content information by said content information selection means.

6. The information processing apparatus according to claim 1, further comprising:
active state recognition means for recognizing an active state of said plurality of information reproducing units.

7. The information processing apparatus according to claim 6,
wherein the operation command change means changes the handling of content operation commands from a user according to the active state of said plurality of information reproducing unit.

8. The information processing apparatus according to claim 1, wherein
said plurality of information reproducing units supply content information to said content information managing means.

9. The information processing apparatus according to claim 1, wherein
said content information managing means makes an inquiry about content information to said plurality of information reproducing units.

10. The information processing apparatus according to claim 2, wherein
an inquiry about content information is made to said plurality of information reproducing units from said content information selection means having said GUI.

11. The information processing apparatus according to claim 2, wherein
content information is supplied to said content information selection means having said GUI from said plurality of information reproducing units.

12. The information processing apparatus according to claim 1, wherein
a timing in which content information is updated is a timing in which the contents mounted on said plurality of information reproducing units are updated.

13. The information processing apparatus according to claim 1, wherein
a timing in which content information is updated is periodic at fixed time intervals.

14. An information processing system in which a plurality of information reproducing apparatuses are connected to a server apparatus via an interface to perform control of information, the information processing system comprising:
reproducing control means for controlling said plurality of information reproducing apparatuses from said server device;
content information managing means for managing content information corresponding to contents of an information source in said plurality of information reproducing apparatuses;
content information selection means for selecting any content information in the content information managing means from said server apparatus; and
operation command change means for changing a handling of a content operation command from a user as a function of whether selected information reproducing units are active and whether selected reproducing units are currently reproducing different content,
wherein said server apparatus records selected content information and a unit ID of one of said plurality of information reproducing apparatuses which has said content information,
wherein said server apparatus displays said content information when no other information reproducing apparatuses are connected to said server apparatus, the displayed content information providing for selection of the content information, and
wherein the information reproducing apparatus having the content corresponding to the content information selected is put to an active state for reproducing the content.

15. The information processing system according to claim 14, wherein
said content information selection means has a GUI capable of displaying content information for selection.

16. The information processing system according to claim 14, wherein
an event ID of the MPEG stream of the contents is selected as content information by said content information selection means.

17. The information processing system according to claim 14, wherein
a title of the contents is selected as content information by said content information selection means.

18. The information processing system according to claim 14, wherein
the recorded date and time of the contents are selected as content information by said content information selection means.

19. The information processing system according to claim 14, further comprising
active state recognition means for recognizing the active state of said plurality of information reproducing apparatuses.

20. The information processing system according to claim 19,
wherein the operation command change means changes the handling of the content operation commands from the user according to the active state of said plurality of information reproducing apparatuses.

21. The information processing system according to claim 14, wherein
said plurality of information reproducing apparatuses themselves supply content information to said content information managing means.

22. The information processing system according to claim 14, wherein
said content information managing means makes an inquiry about the contents information to said plurality of information apparatuses.

23. The information processing system according to claim 15, wherein
an inquiry about content information is made to said plurality of information reproducing apparatuses from said content information selection means having said GUI.

24. The information processing system according to claim 15, wherein content information is supplied to said content information selection means having said GUI from said plurality of information reproducing apparatuses.

25. The information processing system according to claim 14, wherein
the timing in which content information is updated is a timing in which the contents mounted on said plurality of information reproducing apparatuses are updated.

26. The information processing system according to claim 14, wherein
the timing in which content information is updated is periodic at fixed time intervals.

27. A computer-readable medium for storing executable program code for controlling an information processing apparatus in which a plurality of information reproducing units are connected to an information processing unit via an interface to perform control of information, the program code comprising:

a generation step of generating first control information for controlling said plurality of information reproducing units;

a content information managing step for managing content information corresponding to contents of an information source in said plurality of information reproducing units;

a content information selection step for selecting any content information in said content information managing step from said information processing unit;

an operation command change step for changing a handling of a content operation command from a user as a function of whether selected information reproducing units are active and whether selected reproducing units are currently reproducing different content, a content information and ID recording step for recording selected content information and a unit ID of one of said plurality of information reproducing units which has said content information onto the information processing apparatus, a displaying step for displaying said content information on the information processing apparatus when no other information reproducing units are connected to said information processing unit, the displayed content information providing for selection of the content information, and wherein the information reproducing unit having the content corresponding to the content information selected be put to an active state for reproducing the content.

* * * * *